United States Patent [19]

Hartley

[11] 4,242,061

[45] Dec. 30, 1980

[54] DOUBLE DIAPHRAGM PUMP

[76] Inventor: E. Dale Hartley, 2700 Jalmia Dr., Los Angeles, Calif. 90046

[21] Appl. No.: 946,770

[22] Filed: Sep. 28, 1978

[51] Int. Cl.[3] .......................... F04B 23/06; F04B 39/00; F16H 21/14

[52] U.S. Cl. .......................................... 417/536; 74/44; 74/50

[58] Field of Search ................................ 417/534–537; 74/44, 50

[56] References Cited

U.S. PATENT DOCUMENTS

| | | | |
|---|---|---|---|
| 2,348,332 | 5/1944 | Craig et al. | 74/44 |
| 2,677,966 | 5/1954 | Mueller | 417/535 |
| 3,095,824 | 7/1963 | Elfes | 417/471 |
| 3,410,477 | 11/1968 | Hartley | 417/571 |
| 3,834,840 | 9/1974 | Hartley | 417/535 |

FOREIGN PATENT DOCUMENTS

| | | | |
|---|---|---|---|
| 1022273 | 3/1953 | France | 417/534 |

*Primary Examiner*—William L. Freeh
*Attorney, Agent, or Firm*—Gordon L. Peterson

[57] ABSTRACT

A pump having first and second pumping chambers and a double-acting reciprocating piston which partly defines the pumping chambers. The piston is reciprocated by a rotatable drive member which may include an eccentric. The rotatable drive member has a peripheral surface which engages first and second wear members lying on opposite sides of the drive member. Each of the wear members is mounted on the piston for at least limited movement toward and away from the drive member. First and second resilient elements are positioned between the first wear member and the piston and the second wear member and the piston, respectively. The resilient elements resiliently support the wear members to provide a good driving connection between the drive member and the piston.

19 Claims, 8 Drawing Figures

DOUBLE DIAPHRAGM PUMP

BACKGROUND OF THE INVENTION

Various kinds of pumps, such as water pumps, vacuum pumps, compressors, etc. utilize a piston to provide the pumping action. By using a double-acting piston, one piston can provide the pumping action for separate pumping chambers with the pumping chambers being operated out of phase.

Motors for driving pumps typically provide rotary output motion. It is necessary to convert the rotary output motion of the motor to a linear reciprocating driving force in order that the double-acting piston can be reciprocated. One convenient way to accomplish this is to use a rotatable drive member which may include a cam or an eccentric. With this arrangement, the rotatable drive member bears against spaced apart, opposed surfaces of the piston, and this enables rotary motion of the eccentric to linearly reciprocate the piston. Pistons of this type are shown, for example, in my prior U.S. Pat. Nos. 3,410,477 and 3,834,840.

One problem with constructions of this type is how to properly provide for contact between the rotatable drive member and the associated drive surfaces of the piston. Ideally, there should be no clearance between the peripheral surface of the rotatable drive member and the drive surfaces of the piston. If there is a very slight clearance space, even as small as 0.002 inch, wear is accelerated and noise is produced. On the other hand, if there is any significant preloading of the rotatable drive member, the rotatable drive member tends to skid on the drive surfaces of the piston, and this also accelerates wear.

SUMMARY OF THE INVENTION

A zero-clearance condition which is ideally optimum, cannot, of course, be achieved in actual practice. However, the present invention provides for an extremely light preload on the rotatable drive member, and this materially reduces wear.

With this invention, relatively hard wear members are mounted on a reciprocable member which may be, or include, a piston. The wear members are on opposite sides of the rotatable drive member so that each of these wear members can move at least a limited amount toward and away from the rotational axis of the rotatable drive member. The wear members are supported by support means in such a way as to provide only a very light preload on the rotatable drive member.

The support means may take different forms. For example, the support means may include a stack of metal shims between each of the wear members and the adjacent drive surfaces of the piston. Each of the shims is thin and constructed of a suitable material, such as metal, so that, by carefully inserting the shims, the preload can be very accurately maintained.

Although the shims are very satisfactory, their use increases the time for assembly. To significantly speed up the assembly, the support means may include first and second resilient elements between the first and second wear members and the adjacent drive surfaces, respectively, of the piston. These resilient elements resiliently support the associated wear members and provide a very light preload on the rotatable drive member thereby eliminating the rapid wear and noise which accompany a heavier preload or a clearance space. Moreover, when the rotatable drive member is moving the piston in a first direction, the first resilient element is compressed, and the second resilient element is permitted to slightly expand so that little or no gap appears between the rotatable drive member and the second drive surface.

Preferably, the surfaces of the wear members which engage the rotatable drive member should remain parallel during reciprocation of the piston. If this condition is not maintained, the drive member is caused to work into either an opening or closing wedge, and this is undesirable. To maintain this parallel relationship, the wear members are preferably mounted for movement which includes pivotal movement toward and away from the rotational axis of the rotatable drive member. The pivotal axes of the wear members are arranged on opposite sides of a plane which contains a rotational axis of the rotatable drive member and which is generally transverse to the wear members. With this arrangement, the wear members tend to pivot together about their respective pivotal axes so as to maintain a parallel relationship between the wear members.

This invention utilizes a tab on each of the resilient elements to considerable advantage. First, this construction mounts the wear member on the resilient element. Secondly, by causing the tabs to project beyond their associated wear members toward the rotatable drive member, the tabs releasably contain the rotatable drive member within the piston. Finally, because the tabs are resilient, the rotatable drive member can be forced over one of the tabs into the piston to thereby facilitate assembly of the rotatable drive member within the piston.

Assembly is also facilitated by loosely mounting the wear members on the piston. For example, the wear members can have openings which loosely fit over posts on the piston to loosely mount the wear members. The rotatable drive member holds the wear members on these posts and forces the resilient elements against the drive surfaces of the piston.

The resilient elements can take different forms and may be, for example, constructed of hard rubber or be in the form of a metal spring. Hard rubber is preferred because a metal spring has a lower spring rate which necessitates a higher preload. When the resilient elements are constructed of hard rubber, each of them can advantageously have regions of different thicknesses to enhance its resilience and the resilient elements can be fit into a gap between the associated wear member and the associated drive surface of the piston.

Preferably, the wear member-resilient element construction is provided on both sides of the rotatable drive member in order to obtain the maximum benefit from the features provided by this construction. However, this construction may be used on only one side of the rotatable drive member, if desired, and these advantages will be obtained to some degree.

The piston can be used in various different pumping and fluid handling devices, such as a water pump. For example, a pump constructed in accordance with the teachings of this invention may include a housing having an inlet and an outlet and a cavity in the housing. The piston and rotatable drive member are mounted in the cavity of the housing, and first and second diaphragms are coupled to the opposite ends of the piston and cooperate with portions of the piston and the housing to define first and second pumping chambers. With this construction, all portions of the piston and housing which define the pumping chambers can be constructed of the same plastic material so as to reduce the likelihood of chemical action occurring between the liquid being handled by the pumping chambers and this plastic material.

This invention employs inlet and outlet check valves of novel construction. Each of the check valves includes a concave valve seat and a concave resilient element seated in the concavity of the concave seat. The concavity opens in a downstream direction, and the valve seat has a passage extending through it and opening at the valve element.

One advantage of this check valve construction is that the concave resilient valve element has a higher spring rate than a flat rubber disc, and accordingly, the check valve closes more rapidly than the flat rubber disc check valve of the prior art. In addition, the concave resilient valve element does not open as far as the flat resilient valve element, and this also hastens rapid closing of the valve. Finally, fluid can flow through this check valve without as an abrupt change of direction as is required in the prior art check valve which uses a flat, resilient valve element. Although the concave valve seat may take different forms, it can advantageously be in the form of a cone.

The inlet and outlet check valves can be made interchangeable. In this event, the housing preferably includes means which prevents the check valves from being installed in any position other than with the concavities of the valve seats opening downstream.

Each of the diaphragms, in addition to partially defining a pumping chamber, is also used to seal between adjacent housing sections and around the inlet and outlet check valves. To this end, the diaphragms have openings in which the valve seats are positioned, and the valve elements are in turn suitably mounted on the associated valve seats.

The invention, together with further features and advantages thereof, may best be understood by reference to the following description taken in connection with the accompanying illustrative drawing.

DESCRIPTION OF THE PREFERRED EMBODIMENT

Figure 1:
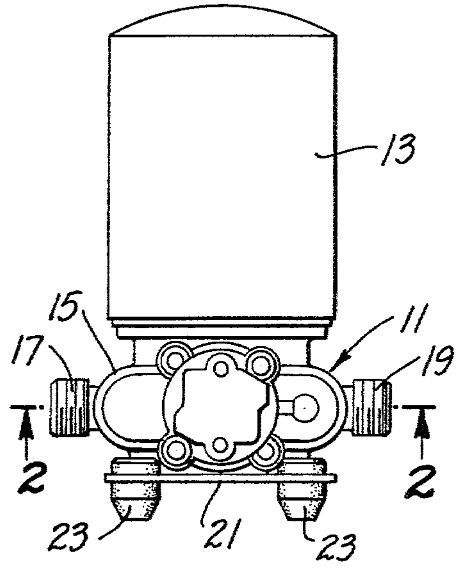
FIG. 1 is an elevational view of a pump constructed in accordance with the teachings of this invention.

FIG. 1 shows a pump 11 and an electric motor 13 for driving the pump. The pump 11 includes a housing 15, an inlet 17, an outlet 19, a base plate 21 coupled to the lower end of the housing 15 and four (only two being shown) resilient vibration isolation mounts 23 coupled to the base plate for mounting the pump and motor on a suitable supporting surface (not shown). Although the features of this invention have many different applications, the pump 11 shown by way of example in the drawings, is a water pump of the type suitable for use with water systems for recreational vehicles.

Although the housing 15 can be constructed in different ways, in the embodiment illustrated, it includes a main body 25 and cover sections 27 and 29 (FIG. 2), each of which is integrally molded from a suitable rigid plastic material. The housing 15 defines a cavity 31 which is completely closed, except for the inlet 17 and the outlet 19. A pressure switch 33 is mounted on the cover section 27, and mounting bolts 35 (FIGS. 2 and 4) attach the pump 11 to the motor 13.

Figure 4:
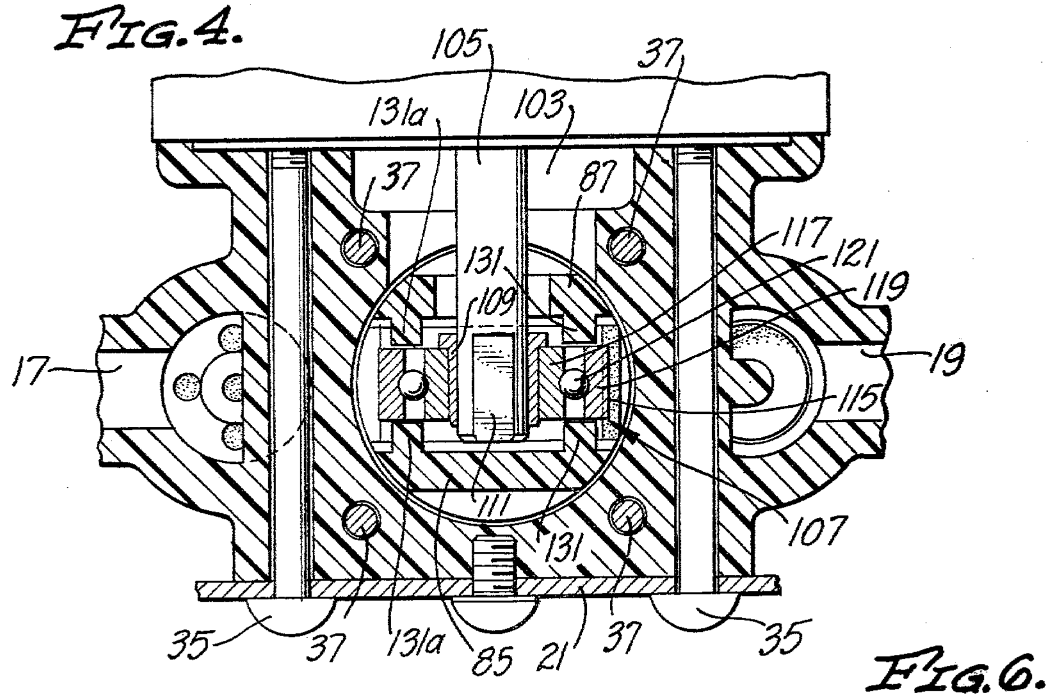
FIG. 4 is a fragmentary sectional view taken generally along line 4—4 of FIG. 2.

The cover sections 27 and 29 are suitably attached to the main body 25 as by screws 37 (FIG. 4). Identical diaphragms 39 and *39a* extend across the cavity 31 and have integral, annular seals 41 and *41a*, respectively, for sealing the interfaces between the cover sections 27 and 29 and the main body 25. Portions of the diaphragm *39a* corresponding to portions of the diaphragm 39 are designated by corresponding reference numerals followed by the letter "a."

The piston 43 is mounted in the cavity 31 for axial reciprocating movement in a cylinder 45 formed integrally with the main body 25. The inner peripheries of the diaphragms 39 and *39a* are joined, as described more particularly hereinbelow, to the opposite ends of the piston 43. Accordingly, the diaphragms 39 and *39a* cooperate with the housing 15 and the opposite ends of the piston 43 to define identical pumping chambers 47 and *47a*.

On the intake stroke of the piston 43 for the pumping chamber 47, water flows from the inlet 17 through an inlet passage 49 defined by the main body 25 through an inlet check valve 51 to the pumping chamber 47. The inlet check valve 51 includes a rigid, concave valve seat 53 and a resilient, flexible valve element 55 seated in the recess or concavity of the valve seat. In the embodiment illustrated, the valve seat 53 has a conical recess 57 which opens downstream and into the pumping chamber 47. The valve element 55 is of a complementary conical configuration and is seated in the recess 57 with the cone of the valve element opening downstream. The valve element 55 has an axial central projection 59 which is received in a center aperture of the valve seat 53 to mount the valve element on the valve seat with the valve element being downstream of the valve seat. One or more passages 61 extend through the valve seat and open at the valve element 55.

The valve seat 53 is mounted in an opening 63 in the diaphragm 39 and its periphery is held against a circumscribing shoulder 65 of the main body 25 by the cover section 27. A tab 67 formed integrally with the cover section 27 engages one end of the central projection 59 of the valve seat 53 to prevent the inlet check valve 51 from being assembled backwards in the housing 15. In addition, the tab 67 assures that the valve element 55 cannot be removed from the valve seat 53.

An identical, interchangeable inlet check valve *51a* is provided between the inlet passage 49 and the pumping chamber *47a*. Portions of the inlet check valve *51a* corresponding to portions of the inlet check valve 51 are designated by corresponding reference numerals followed by the letter "a." The cover section 29 has a tab *67a* which performs the same functions with respect to the inlet check valve 51*a* that the tab 67 performs for the inlet check valve 51.

Water can be discharged from the pumping chamber 47 on the discharge stroke of the piston 43 through an outlet check valve 51*b* and the outlet passage 69 to the outlet 19. Except for an axial passage 71 through the projection 59*b*, the outlet check valve 51*b* can be identical to the inlet check valve 51, and portions thereof corresponding to portions of the inlet check valve 51 are designated by corresponding reference numerals followed by the letter "b." The purpose of the passage 71 is to provide water at discharge pressure to the pressure switch 33 via a passage 73 in the cover section 27. The pressure switch 33 may utilize this discharge pressure information in a well-known manner to cycle the motor 13 on and off to maintain the discharge pressure of the pump 11 within the desired range.

An outlet check valve 51*c* which is identical to, and interchangeable with, the inlet check valve 51 is provided between the pumping chamber 47*a* and the outlet passage 69. Portions of the outlet check valve 51*c* corresponding to portions of the inlet check valve 51 are designated by corresponding reference numerals followed by the letter "c."

The outlet check valves 51*b* and 51*c* are installed in openings 63*b* and 63*c*, respectively, of the diaphragms 39 and 39*a*. To assure that the outlet check valves 51*b* and 51*c* are installed with their recesses opening downstream and with the valve elements 55*b* and 55*c* being downstream of their associated valve seats, a plate 75 integral with the main body 25 is provided in the outlet passage 69 with the plate 75 having tabs 77 and 77*a*, respectively, for preventing the outlet check valves 51*b* and 51*c* from being inserted backwards, i.e., with their valve elements facing upstream.

The piston 43 includes a piston body 79 constructed of a suitable rigid plastic material, identical piston caps 81 and 81*a*, and identical retainers 83 and 83*a*. The caps 81, the retainers 83, the piston body 79, the cover sections 27 and 29 and the main body 25 are constructed of the same plastic material.

The piston body 79 is integrally molded of plastic material and includes spaced parallel webs 85 and 87 (FIG. 3) defining an opening 89 therebetween and integrally joining opposite end sections 91 and 91*a*. The piston body 79 has spaced parallel drive surfaces 93 and 93*a* which are located at the bottoms of grooves and which are spaced apart by the opening 89.

Figure 6:
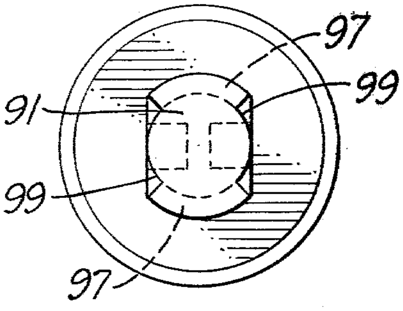
FIG. 6 is a top view of one end of the piston.

The end section 91 cooperates with the piston cap 81 and the retainer 83 to attach an inner peripheral region 95 of the diaphragm 39 to the piston 43. Although this can be accomplished in different ways, in the embodiment illustrated, the region 95 of the diaphragm 39 has a noncircular opening through which the end section 91 projects. The end section 91 is of a corresponding noncircular configuration as viewed in end elevation (FIG. 6), and this properly orients the piston 43 about the axis of the opening in the diaphragm. The end section 91 has grooves 97 which open at slots or cut-outs 99. The piston cap 81 has a central opening with a configuration corresponding to the noncircular configuration of the end section 91, and this allows it to be placed over the end section and seated against the region 95 of the diaphragm 39 to form a fluid tight seal. The retainer 83 has flanges 101 (FIG. 3) which project radially inwardly and which are adapted to be received in the cut-outs 99 and rotated to positions in the grooves 97, respectively, of the end section 91 to form a bayonet-type of locking arrangement. The noncircular configuration of the end section 91 and of the opening in the piston cap 81 prevents relative rotation between these members when the retainer 83 is turned. The piston cap 81*a* and the retainer 83*a* cooperate in the same manner with the end section 91*a* to attach an inner region 95*a* of the diaphragm 39*a* to the piston 43.

Figure 3:
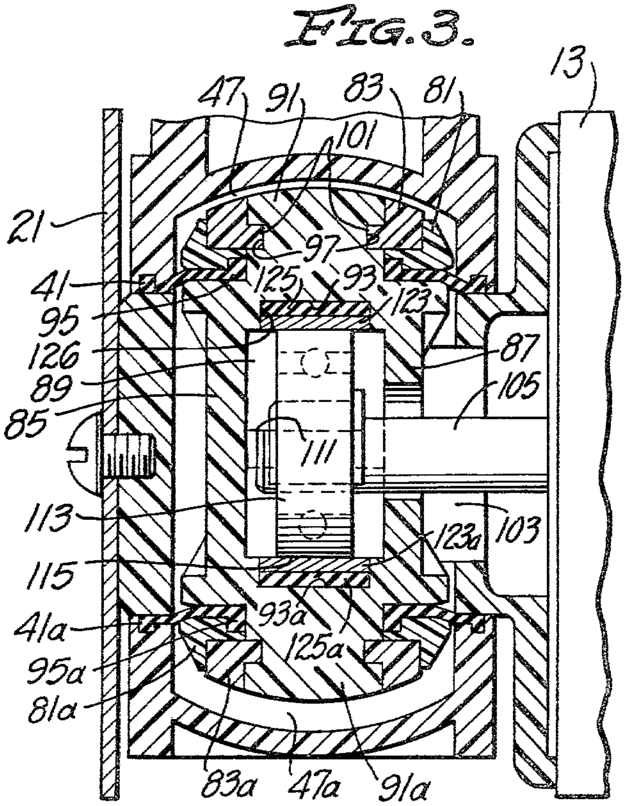
FIG. 3 is a fragmentary sectional view taken generally along line 3—3 of FIG. 2.
Figure 2:
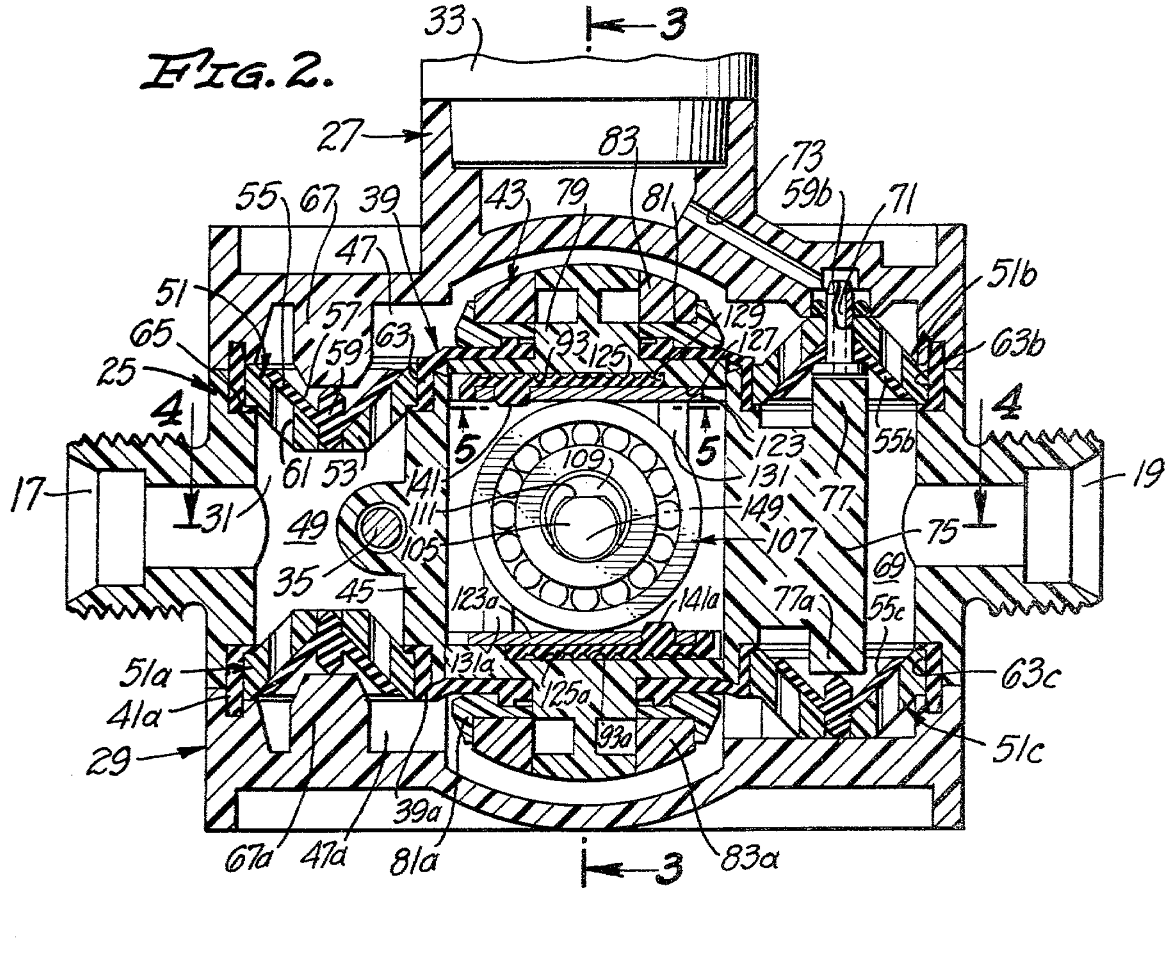
FIG. 2 is an enlarged fragmentary sectional view taken generally along line 2—2 of FIG. 1.

The piston 43 is mounted for axial reciprocating movement as best shown in FIGS. 2 and 3. The cylinder 45 is formed by the housing 15, and in the embodiment illustrated, is formed integrally with the main body 25. As shown in FIGS. 3 and 4, the cylinder 45 has an opening 103.

The power for reciprocating the piston 43 is provided by the motor 13. The motor has a rotatable motor output shaft 105 which projects through the opening 103 (FIGS. 3 and 4) of the cylinder 45 into the opening 89 of the piston 43.

A rotatable drive member 107 is used to convert the rotary motion of the output shaft 105 to a force which will linearly reciprocate the piston 43. Although the rotatable drive member 107 can take different forms, in the embodiment illustrated, it is in the form of a rolling scotch yoke. As such, the drive member 107 includes an eccentric 109 of an appropriate material, such as bronze, which is keyed to rotate with the motor shaft 105 by corresponding flats 111 (FIGS. 2 and 4). A bearing 113 is mounted on the eccentric 109 and has a cylindrical, peripheral surface 115 which surrounds the rotational axis of the rotatable drive member 107. The bearing 113 is preferably a ball bearing having an inner race 117 (FIG. 4) pressed on or otherwise attached to the eccentric 109, an outer race 119 which defines the peripheral surface 115 and the usual balls 121 between the races. Because the bearing 113 is mounted on the eccentric 109, the center of rotation of the rotatable drive member 107 is displaced from the rotational axis of the motor output shaft 105 so consequently the rotatable drive member 107 is provided with some "throw" which can be utilized to reciprocate the piston 43.

Figure 5:
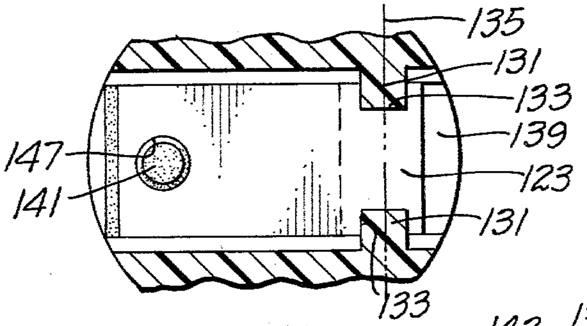
FIG. 5 is an enlarged fragmentary sectional view taken generally along line 5—5 of FIG. 2.
Figure 7:
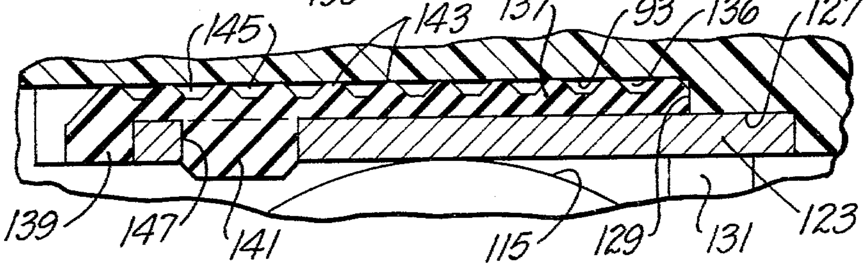
FIG. 7 is an enlargement of the portion of FIG. 2 which illustrates one of the wear members and the associated resilient element.

In order to utilize the "throw" of the rotatable drive member 107, identical wear members in the form of wear plates 123 and 123*a* and identical resilient elements 125 and 125*a* are utilized. The wear plate 123 and the resilient element 125 are seated in a groove 126 (FIG. 3) in the piston 43 with the drive surface 93 forming the bottom of the groove. The wear plate is preferably constructed of a wear resistant material, such as a metal which may be steel. As best seen in FIG. 7, the piston body 79 has a rigid mounting surface 127 spaced from the drive surface 93 by a shoulder 129. A pair of posts 131 (FIGS. 2, 5 and 7) project generally perpendicularly from the mounting surface 127. The wear plate 123 has openings or notches 133 for loosely receiving the posts 131, respectively, to loosely mount the wear plate 123. This mounts the wear plate 123 for movement which includes pivotal movement about a pivotal axis 135 toward and away from the rotatable drive member 107. With the wear plate 123 mounted on the posts, it cooperates with the piston 43 to define a gap 136.

The resilient element 125 is constructed of a flexible, resilient material, such as hard rubber, and it includes a plate section 137, an end flange 139 and a projection or tab 141 extending away from the plate section. The plate section 137 is received in the gap 136 between the wear plate 123 and the drive surface 93 and is essentially coextensive with the portion of the wear plate which overhangs the shoulder 129. The plate section 137 engages the shoulder 129 and has a series of parallel ridges 143 separated by grooves 145 to enhance the resilience of the plate section 137 across its thickness. The ridges 143 rest on the drive surface 93. The projection 141 extends through a correspondingly configured aperture 147 in the wear plate 123 to thereby attach the resilient element 125 to the wear plate with the flange 139 bearing against one edge of the wear plate to prevent relative pivotal motion between the wear plate and the resilient element. The projection 141 projects beyond the wear plate 123 as best shown in FIG. 7.

The wear plate 123*a* and the resilient element 125*a* are constructed, arranged and mounted in the same manner as the wear plate 123 and the resilient element 125, and corresponding portions are designated by corresponding reference numerals followed by the letter "a." However, the posts 131 and 131*a* are diametrically opposed so that the pivotal axes of the wear plates 123 and 123*a* lie on the opposite sides of a plane 149 (FIG. 2) which contains the rotational axis of the rotatable drive member 107 and which lie perpendicular to the wear plates 123 and 123*a*. This also places the projections 141 and 141*a* in diametrically opposed relationship. The pivotal axes of the wear plates 123 and 123*a* are essentially parallel to each other and to the plane 149, and the wear plates or at least the surfaces thereof which engage the peripheral surface 115 of the rotatable drive member 107 are parallel. The mounting posts 131 and 131*a* are equidistant from the plane 149.

Assembly of the rotatable drive member 107 is facilitated in that the bearing 113 can be pressed on the eccentric 109 and then the eccentric 109 is slid onto the motor shaft 105. The posts 131 and 131*a* extend along the sides of the bearing as shown in FIG. 4 to guide or loosely retain the bearing and the eccentric 109 axially on the motor output shaft 105. The rotatable drive member 107 can be installed in the opening 89 by forcing the rotatable drive member over one of the projections 141 and 141*a*. Once in this position, the projections 141 and 141*a* releasably retain the rotatable drive member 107 in the opening 89 of the piston 43, and the rotatable drive member holds the wear plates 123 and 123*a* on the posts 131 and 131*a*.

With the rotatable drive member 107 installed, the peripheral surface 115 of the rotatable drive member is lightly engaged by the confronting surfaces of the wear plates 123 and 123*a*. Because the mounting posts 131 and 131*a* are on the opposite sides of the plane 149, the wear plates 123 and 123*a* tend to remain parallel.

In operation, rotation of the motor output shaft 105 by the motor 13 rotates the rotatable drive member 107 to linearly reciprocate the piston 43. The piston 43 is double acting to alternately provide the pumping chambers 47 and 47*a* with intake and discharge strokes. For example, as the piston 43 moves downwardly, as viewed in FIG. 2, the pumping chamber 47 is expanded to provide a reduced pressure therein or suction. The pressure is reduced sufficiently so that water in the inlet passage 49 forces the valve element 55 inwardly off of the valve seat 53 to permit water to flow through the passages 61 into the pumping chamber 47. Simultaneously, the downward stroke (as viewed in FIG. 2) of the piston 43 reduces the volume of the pumping chamber 47*a* to increase the pressure therein sufficiently to open the outlet check valve 51*c* so that the water in the chamber 47*a* is discharged under pressure through the outlet passage 69 to the outlet 19. As the piston 43 moves upwardly, as viewed in FIG. 2, the action of the pumping chambers 47 and 47*a* is reversed with the pumping chamber 47 discharging water through the outlet check valve 51*b* and with the pumping chamber 47*a* drawing water in through the inlet check valve 51*a*.

More specifically, with the rotatable drive member 107 being rotated clockwise as viewed in FIG. 2, the peripheral surface 115 of the bearing 113 bears against the wear plate 123 to provide a downward (as viewed in FIG. 2) force on the wear plate 123*a* and the piston 43. This force is transmitted through the wear plate 123*a* and at least in part through the resilient element 125*a* to the piston 43 to force the piston downwardly. This provides a compressive force on the resilient element 125*a* which tends to reduce its thickness slightly and tends to pivot the wear plate 123*a* clockwise about its pivotal axis as viewed in FIG. 2. However, to the extent that the resilient element 125*a* compresses, the resilient element 125 can expand to pivot the wear plate 123 counterclockwise about its pivotal axis as viewed in FIG. 2 to maintain the wear plates 123 and 123*a* parallel. If the expansion of the resilient element 125 is insufficient, a very slight gap will appear between the peripheral surface 115 and the wear plate 123. This action is reversed on the upstroke (as viewed in FIG. 2) of the piston 43.

Figure 8:
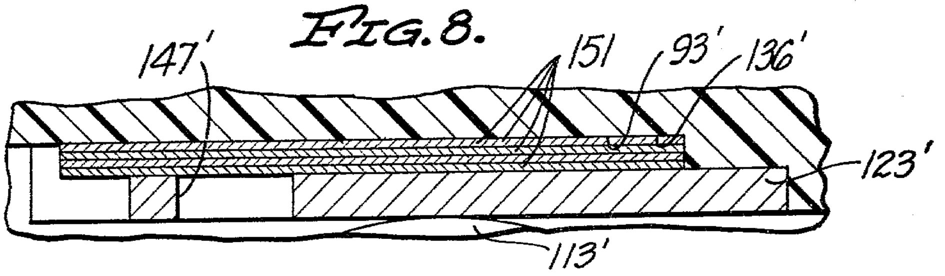
FIG. 8 is a view similar to FIG. 7 showing the use of shims in lieu of a resilient element to support one of the wear members.

FIG. 8 shows an alternate way of supporting the wear plates, and portions of the embodiment shown in FIG. 8 corresponding to portions of the embodiment shown in FIG. 8 corresponding to portions of the embodiment shown in FIGS. 1–7 are designated by corresponding primed reference characters. The construction of FIG. 8 is identical to the construction shown in FIGS. 1–7, except that the resilient element 125 is replaced by a plurality of thin, metal shims 151 arranged in a stack between the piston drive surface 93' and the confronting surface of the wear plate 123'. An appropriate number of the shims 151 are inserted into the gap 136' to form a light preload on the bearing 113'. The shims can be held against withdrawal from the gap 136' in any suitable manner.

Although exemplary embodiments of the invention have been shown and described, many changes, modifications and substitutions may be made by one having ordinary skill in the art without necessarily departing from the spirit and scope of this invention.

I claim:

1. An apparatus comprising:

a reciprocable member having first and second spaced apart drive surfaces;

means for mounting said reciprocable member for reciprocating movement along a path;

a rotatable drive member for driving said reciprocable member in both directions along said path;

means for mounting said drive member for rotation about a rotational axis;

said drive member having a peripheral surface between said first and second drive surfaces, said peripheral surface extending circumferentially of said rotational axis;

first and second wear members between said peripheral surface and said first and second drive surfaces, respectively, each of said wear members being engageable with said peripheral surface;

first means for mounting the first wear member on said reciprocable member for at least limited movement toward and away from the rotational axis;

second means for mounting the second wear member on the reciprocable member for at least limited movement toward and away from the rotational axis;

first support means between said first drive surface and said first wear member to at least partially support the first wear member; and second support means between said second drive surface and said second wear member to at least partially support the second wear member whereby rotation of said drive member causes the peripheral surface to bear against the first wear member to drive the reciprocable member in a first direction along the path and to bear against the second wear member to drive the reciprocable member in a second direction along the path.

2. An apparatus as defined in claim 1 wherein said reciprocable member has a rigid first mounting surface adjacent said first drive surface, said first wear member being engageable with and at least partially supportable by said first rigid mounting surface, said mounting surface terminating in an edge and said first wear member overhanging said edge to define a gap between the first wear member and said first drive surface, said first support means lying between said first drive surface and said first wear member.

3. An apparatus as defined in claim 2 wherein said first support means includes a plurality of shims stacked in said gap.

4. An apparatus as defined in claim 1 wherein said first wear member includes a first wear plate and said first support means includes a strip of resilient material.

5. An apparatus as defined in claim 1 wherein said reciprocable member has a rigid first mounting surface adjacent said first drive surface, said first wear member being engageable with said first rigid mounting surface to define a gap between said first wear member and said first drive surface, said first support means being positioned in said gap to resist movement of said first wear member into said gap.

6. An apparatus as defined in claim 5 wherein said first support means includes a strip of resilient material in said gap.

7. An apparatus as defined in claim 5 including a housing having an inlet and an outlet and a cavity in the housing, said reciprocable member including a piston and said rotatable drive member being mounted in said cavity, a diaphragm coupled to said piston and cooperating with portions of said piston and said housing to define a first pumping chamber.

8. An apparatus comprising:

a reciprocable member having a first drive surface;

means for mounting said reciprocable member for reciprocating movement along a path;

a rotatable drive member for driving said reciprocable member in at least one direction along said path;

means for mounting said drive member for rotation about a rotational axis;

said drive member having a peripheral surface extending circumferentially of said rotational axis;

a first wear member between said peripheral surface and said first drive surface and engageable with said peripheral surface;

first means for mounting the first wear member on said reciprocable member for at least limited movement toward and away from the rotational axis;

support means between said first drive surface and said first wear member to at least partially support the first wear member whereby rotation of said drive member causes the peripheral surface to bear against the first wear member to drive the reciprocable member in said one direction along the path; and a housing having an inlet and an outlet and a cavity in the housing, said reciprocable member including a piston and said rotatable drive member being mounted in said cavity, a diaphragm coupled to said piston and cooperating with portions of said piston and said housing to define a first pumping chamber.

9. An apparatus as defined in claim 8 wherein the portions of said piston and said housing which cooperates with the diaphragm to define said first pumping chamber are constructed of the same plastic material.

10. An apparatus as defined in claim 8 including inlet check valve means in said housing upstream of said first pumping chamber for permitting fluid flow from the inlet to said first pumping chamber and for substantially preventing flow in the reverse direction through said inlet check valve means and outlet check valve means in said housing downstream of said first pumping chamber to the outlet and for substantially preventing flow in the reverse direction through said outlet check valve means, at least one of said check valve means including a concave valve seat and a concave resilient valve element in the concavity of said concave valve seat, said concavity opening downstream, and a passage in the valve seat extending through the valve seat and terminating at the valve element.

11. An apparatus as defined in claim 8 wherein said diaphragm has a noncircular opening therein and said piston has a noncircular end section extending through said opening in said diaphragm, the noncircular configurations of said opening and said end section cooperating to orient said piston in said housing about the axis of said noncircular opening.

12. A pump comprising:

a housing having an inlet and an outlet and a cavity in said housing;

a piston having first and second spaced apart drive surfaces;

means for mounting said piston in said housing for reciprocating movement along a path;

first and second diaphragms coupled to the opposite end portions of said piston, respectively, and to said housing, said first and second diaphragms cooperating with said piston and said housing to define first and second pumping chambers, respectively;

inlet passage means for providing communication between said inlet and said first and second pumping chambers;

outlet passage means for providing communication between said first and second pumping chambers and said outlet;

inlet check valve means for permitting fluid flow from said inlet passage means to said first and second pumping chambers and for substantially preventing reverse fluid flow through the inlet check valve means;

outlet check valve means for permitting fluid flow from said first and second pumping chambers to said outlet chamber and for substantially preventing reverse fluid flow through the outlet check valve means;

a rotatable drive member for driving said piston in both directions along said path whereby the volumes of said pumping chambers are varied to pump fluid therethrough;

means for mounting said drive member for rotation about a rotational axis, said drive member having some throw as it rotates about said rotational axis;

said drive member having a peripheral surface extending circumferentially of said rotational axis, said peripheral surface lying between said drive surfaces;

first and second wear members between said peripheral surface and said first and second drive surfaces, respectively, said wear members being engageable with said peripheral surface on the opposite sides of said drive member;

first means for mounting the first wear member on said piston for at least limited movement toward and away from the rotational axis;

second means for mounting the second wear member on said piston for at least limited movement toward and away from said rotational axis; and first and second resilient elements, at least portions of said first and second resilient elements lying between said first drive surface and said first wear member and said second drive surface and said second wear member, respectively, to at least partially resiliently support the wear members whereby rotation of said drive member causes the peripheral surface to bear against said wear members to reciprocate said piston along the path.

13. A pump as defined in claim 12 wherein said first and second means mount the first and second wear members for movement which includes pivotal movement about first and second pivotal axes, respectively, said first and second pivotal axes lying on opposite sides of a plane which contains the rotational axis and which is generally transverse to the first and second wear members.

14. A pump as defined in claim 13 wherein said first and second resilient elements include first and second resilient tabs, respectively, which project beyond the associated wear members toward the drive member, said tabs being on opposite sides of said plane, said first tab being on the opposite side of said plane from said first pivotal axis.

15. An apparatus comprising:

a reciprocable member having a first drive surface;

means for mounting said reciprocable member for reciprocating movement along a path;

a rotatable drive member for driving said reciprocable member in at least one direction along said path;

means for mounting said drive member for rotation about a rotational axis;

said drive member having a peripheral surface extending circumferentially of said rotational axis;

a first wear member between said peripheral surface and said first drive surface and engageable with said peripheral surface;

first means for mounting the first wear member on said reciprocable member for at least limited movement toward and away from the rotational axis;

support means between said first drive surface and said first wear member to at least partially support the first wear member whereby rotation of said drive member causes the peripheral surface to bear against the first wear member to drive the reciprocable member in said one direction along the path; and said support means including a stack of shims between said first wear member and said first drive surface;

16. An apparatus comprising:

a reciprocable member having a first drive surface;

means for mounting said reciprocable member for reciprocating movement along a path;

a rotatable drive member for driving said reciprocable member in at least one direction along the path;

means for mounting said drive member for rotation about a rotational axis;

said drive member having a peripheral surface extending circumferentially of said rotational axis;

a first wear member between said peripheral surface and said first drive surface and engageable with said peripheral surface;

first means for mounting the first wear member on said reciprocable member for at least limited movement toward and away from the rotational axis;

support means between said first drive surface and said first wear member to at least partially support the first wear member whereby rotation of said drive member causes the peripheral surface to bear against the first wear member to drive the reciprocable member in said one direction along the path;

said support means including a first resilient element, at least a portion of the first resilient element lying between said first drive surface and said first wear member to at least partially resiliently support the first wear member whereby rotation of said drive member causes the peripheral surface to bear against the first wear member to drive the reciprocable member in said one direction along the path;

said reciprocable member having a second drive surface spaced by a space from the first drive surface, said peripheral surface being received in said space, a second wear member between said second drive surface and the peripheral surface, second means for mounting the second wear member for at least limited movement toward and away from the rotational axis, and a second resilient element, at least a portion of the second resilient element lying between said second drive surface and said second wear member to at least partially support the second wear member whereby rotation of said drive member causes the peripheral surface to bear against the second wear member to drive the reciprocable member in the other direction along said path; and the first and second means mounting the first and second wear members for movement which includes pivotal movement about first and second pivotal axes, respectively, said first and second pivotal axes lying on opposite sides of a plane which contains the rotational axis and which is generally transverse to the first and second wear members.

17. An apparatus comprising:

a reciprocable member having a first drive surface;

means for mounting said reciprocable member for reciprocating movement along a path;

a rotatable drive member for driving said reciprocable member in at least one direction along said path;

means for mounting said drive member for rotation about a rotational axis;

said drive member having a peripheral surface extending circumferentially of said rotational axis;

a first wear member between said peripheral surface and said first drive surface and engageable with said peripheral surface;

first means for mounting the first wear member on said reciprocable member for at least limited movement toward and away from the rotational axis;

support means between said first drive surface and said first wear member to at least partially support the first wear member whereby rotation of said drive member causes the peripheral surface to bear against the first wear member to drive the reciprocable member in said one direction along the path;

said support means including a first resilient element, at least a portion of the first resilient element lying between said first drive surface and said first wear member to at least partially resiliently support the first wear member whereby rotation of said drive member causes the peripheral surface to bear against the first wear member to drive the reciprocable member in said one direction along the path; and said resilient element including a resilient tab which projects beyond said wear member toward said drive member.

18. An apparatus comprising:

a reciprocable member having a first drive surface;

means for mounting said reciprocable member for reciprocating movement along a path;

a rotatable drive member for driving said reciprocable member in at least one direction along said path;

means for mounting said drive member for rotation about a rotational axis;

said drive member having a peripheral surface extending circumferentially of said rotational axis;

a first wear member between said peripheral surface and said first drive surface and engageable with said peripheral surface;

first means for mounting the first wear member on said reciprocable member for at least limited movement toward and away from the rotational axis;

support means between said first drive surface and said first wear member to at least partially support the first wear member whereby rotation of said drive member causes the peripheral surface to bear against the first wear member to drive the reciprocable member in said one direction along the path;

said support means including a first resilient element, at least a portion of the first resilient element lying between said first drive surface and said first wear member to at least partially resiliently support the first wear member whereby rotation of said drive member causes the peripheral surface to bear against the first wear member to drive the reciprocable member in said one direction along the path; and the portion of the first resilient element lying between the first wear member and the first drive surface having regions of different thicknesses, said first resilient element being constructed of rubber.

19. An apparatus comprising:

a reciprocable member having a first drive surface;

means for mounting said reciprocable member for reciprocating movement along a path;

a rotatable drive member for driving said reciprocable member in at least one direction along said path;

means for mounting said drive member for rotation about a rotational axis;

said drive member having a peripheral surface extending circumferentially of said rotational axis;

a first wear member between said peripheral surface and said first drive surface and engageable with said peripheral surface;

first means for mounting the first wear member on said reciprocable member for at least limited movement toward and away from the rotational axis;

support means between said drive surface and said first wear member to at least partially support the first wear member whereby rotation of said drive member causes the peripheral surface to bear against the first wear member to drive the reciprocable member in said one direction along the path; and the rotatable drive member being adapted to be driven by a rotatable shaft, said rotatable drive member being mounted on said shaft for rotation therewith and being free to move axially on said shaft, said first means including first and second posts and corresponding first and second recesses in said first wear member, said first and second posts extending through said first and second recesses, respectively, and along the opposite sides of said rotatable drive member to limit the amount of axial movement of said rotatable drive member on said shaft.

* * * * *